(12) United States Patent
Yang et al.

(10) Patent No.: US 9,237,576 B2
(45) Date of Patent: *Jan. 12, 2016

(54) POWER CONTROL METHOD, APPARATUS AND SYSTEM

(71) Applicant: Huawei Technologies Co., Ltd., Shenzhen, Guangdong (CN)

(72) Inventors: Kai Yang, Shanghai (CN); Xiang Peng, Shanghai (CN); Zhen Li, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 103 days.

This patent is subject to a terminal disclaimer.

(21) Appl. No.: 14/183,024

(22) Filed: Feb. 18, 2014

(65) Prior Publication Data

US 2014/0162674 A1 Jun. 12, 2014

Related U.S. Application Data

(63) Continuation of application No. 13/723,052, filed on Dec. 20, 2012, now Pat. No. 8,694,047, which is a continuation of application No. PCT/CN2012/073984, filed on Apr. 13, 2012.

(30) Foreign Application Priority Data

May 27, 2011 (CN) .......................... 2011 1 0142177

(51) Int. Cl.
*H04W 52/24* (2009.01)
*H04W 72/04* (2009.01)
(Continued)

(52) U.S. Cl.
CPC ........... *H04W 72/0473* (2013.01); *G06F 1/266* (2013.01); *H04W 52/243* (2013.01);
(Continued)

(58) Field of Classification Search
CPC . H04W 52/367; H04W 52/24; H04W 52/243; H04W 72/0473
USPC ............................................... 455/452.1, 522
See application file for complete search history.

(56) References Cited

U.S. PATENT DOCUMENTS 6,289,217 B1      9/2001  Hamalainen et al.
6,308,080 B1 *   10/2001  Burt ...................... H04W 52/08
                                                                    455/127.2

(Continued)

FOREIGN PATENT DOCUMENTS

CN          1126930 A       7/1996
CN        101662827 A       3/2010
(Continued)

*Primary Examiner* — Hai V Nguyen

(57) ABSTRACT

The present invention discloses a power control method and apparatus. The power control method of the present invention includes: when a service runs in a first-standard communication system, determining a transmit power P1 of the first-standard communication system; determining that the transmit power P1 is higher than or equal to a threshold value P2 of power interference of the first-standard communication system to a second-standard communication system; use a power lower than P1 to send data on an interference frequency of the first-standard communication system. According to the power control method in the present invention, a signal transmit power of the interfering frequency of the first-standard communication system can be reduced when it is determined that the first-standard communication system will cause interference to the second-standard communication system, thereby reducing the interference of the first-standard communication system to the second-standard communication system.

14 Claims, 5 Drawing Sheets

(51) Int. Cl.
   *G06F 1/26* (2006.01)
   *H04W 52/40* (2009.01)
   *H04W 52/36* (2009.01)
   *H04W 88/08* (2009.01)
   *H04L 1/00* (2006.01)

(52) U.S. Cl.
   CPC ............ *H04W52/40* (2013.01); *H04L 1/0001* (2013.01); *H04W 52/365* (2013.01); *H04W 88/08* (2013.01); *Y02B 60/50* (2013.01)

(56) References Cited

U.S. PATENT DOCUMENTS

| | | | |
|---|---|---|---|
| 6,349,094 B1 | 2/2002 | Vastano et al. | |
| 6,351,500 B2* | 2/2002 | Kumar | 329/357 |
| 6,434,367 B1 | 8/2002 | Kumar et al. | |
| 6,463,290 B1* | 10/2002 | Stilp | G01S 5/02 455/456.1 |
| 6,519,460 B1* | 2/2003 | Haartsen | H04B 1/715 370/330 |
| 6,567,459 B1 | 5/2003 | Hakkinen et al. | |
| 6,574,485 B1 | 6/2003 | Salonaho et al. | |
| 6,633,258 B2* | 10/2003 | Lindenmeier | H04B 7/0808 342/374 |
| 6,658,263 B1* | 12/2003 | Ke | H01P 1/213 333/126 |
| 6,829,489 B2* | 12/2004 | Yamamoto | H04B 7/01 370/318 |
| 6,842,624 B2* | 1/2005 | Sarkar | H04W 52/16 455/522 |
| 6,907,229 B2* | 6/2005 | Shpak | H04W 48/20 455/447 |
| 6,990,324 B2 | 1/2006 | Laroia et al. | |
| 7,002,899 B2* | 2/2006 | Azenkot | H04N 7/17309 348/E7.07 |
| 7,027,416 B1 | 4/2006 | Kriz | G01D 21/00 370/328 |
| 7,050,757 B2* | 5/2006 | Snelgrove | G06Q 20/00 455/3.05 |
| 7,050,819 B2 | 5/2006 | Schwengler et al. | |
| 7,116,943 B2* | 10/2006 | Sugar | H04W 16/14 455/226.1 |
| 7,171,161 B2* | 1/2007 | Miller | H04L 27/0012 375/340 |
| 7,184,777 B2* | 2/2007 | Diener | H04L 41/0896 455/456.1 |
| 7,203,511 B2* | 4/2007 | Trachewsky | H04B 17/318 455/115.1 |
| 7,248,841 B2* | 7/2007 | Agee | H04B 7/0417 455/101 |
| 7,254,191 B2* | 8/2007 | Sugar | H04L 1/1664 375/224 |
| 7,295,813 B2* | 11/2007 | Haub | H04B 1/109 375/E1.021 |
| 7,359,730 B2* | 4/2008 | Dennis | H04W 52/10 370/335 |
| 7,386,045 B2* | 6/2008 | Bar-Ness | H04B 1/7176 375/238 |
| 7,424,268 B2* | 9/2008 | Diener | H04L 1/0001 370/241 |
| 7,519,323 B2* | 4/2009 | Mohebbi | H04B 7/15507 455/11.1 |
| 7,558,532 B2* | 7/2009 | Falaki | H04W 88/06 455/343.4 |
| 7,599,686 B2* | 10/2009 | Quinn | H04W 16/10 370/329 |
| 7,610,049 B2 | 10/2009 | Watanabe | |
| 7,650,115 B2* | 1/2010 | Caldwell | H04W 48/02 455/278.1 |
| 7,787,358 B2* | 8/2010 | Wilhelmsson | H04L 25/03006 370/208 |
| 7,860,521 B2* | 12/2010 | Chen | H04W 72/082 455/41.2 |
| 7,881,722 B2* | 2/2011 | Gunnarsson | H04W 72/0486 455/435.2 |
| 8,014,337 B2* | 9/2011 | Rao | H04W 16/14 370/319 |
| 8,085,719 B2* | 12/2011 | Mishra | H04W 72/082 370/329 |
| 8,107,391 B2* | 1/2012 | Wu | H04L 5/003 370/235 |
| 8,165,577 B2* | 4/2012 | Chang | H04W 8/005 455/423 |
| 8,175,539 B2* | 5/2012 | Diener | H04L 1/0001 370/318 |
| 8,203,987 B2* | 6/2012 | Ishii | H04W 52/367 370/311 |
| 8,204,004 B2* | 6/2012 | Hamamoto | H04L 5/06 370/329 |
| 8,223,077 B2 | 7/2012 | Chiang et al. | |
| 8,238,831 B2* | 8/2012 | Sen | H04B 15/00 370/328 |
| 8,315,663 B2* | 11/2012 | Hamdi | H04W 52/26 455/522 |
| 8,320,849 B2* | 11/2012 | Nogami | H04B 7/0671 370/208 |
| 8,442,456 B2* | 5/2013 | Beamish | H03F 1/0211 455/115.1 |
| 8,463,178 B2* | 6/2013 | Monte | H04B 7/18513 455/12.1 |
| 8,554,255 B2* | 10/2013 | Skov | H04W 52/146 370/310 |
| 8,576,738 B2* | 11/2013 | Chen | H04L 5/0037 370/209 |
| 8,588,696 B2* | 11/2013 | Gaikwad | H04W 52/243 370/252 |
| 8,618,954 B2* | 12/2013 | Free | G08G 1/096725 340/540 |
| 8,694,047 B2* | 4/2014 | Yang | G06F 1/266 370/252 |
| 2004/0023674 A1* | 2/2004 | Miller | H04L 27/0012 455/462 |
| 2004/0047324 A1* | 3/2004 | Diener | H04L 1/1664 370/338 |
| 2004/0090937 A1 | 5/2004 | Chaskar et al. | |
| 2004/0092281 A1* | 5/2004 | Burchfiel | H04B 7/0408 455/522 |
| 2004/0116133 A1 | 6/2004 | Kalhan et al. | |
| 2004/0242257 A1 | 12/2004 | Valkealahti et al. | |
| 2005/0059400 A1 | 3/2005 | Jagadeesan et al. | |
| 2005/0090277 A1 | 4/2005 | Islam et al. | |
| 2005/0135459 A1 | 6/2005 | Ginzburg et al. | |
| 2005/0159177 A1* | 7/2005 | Trachewsky | H04B 17/318 455/522 |
| 2005/0197132 A1 | 9/2005 | Lee et al. | |
| 2005/0250527 A1 | 11/2005 | Jugl et al. | |
| 2005/0282494 A1 | 12/2005 | Kossi et al. | |
| 2005/0286547 A1* | 12/2005 | Baum | H04B 1/707 370/437 |
| 2006/0040617 A1* | 2/2006 | Haub | H04B 1/109 455/67.13 |
| 2006/0056448 A1 | 3/2006 | Zaki et al. | |
| 2006/0083205 A1* | 4/2006 | Buddhikot | H04W 16/14 370/338 |
| 2006/0160550 A1* | 7/2006 | Edwards | H04W 72/082 455/509 |
| 2006/0239223 A1* | 10/2006 | Sherman | H04W 72/1215 370/329 |
| 2007/0066228 A1* | 3/2007 | Leinonen | H04B 1/3805 455/67.11 |
| 2007/0140190 A1 | 6/2007 | Rensburg et al. | |
| 2007/0298721 A1* | 12/2007 | Mishra | H04W 72/082 455/66.1 |
| 2008/0025254 A1* | 1/2008 | Love | H04W 52/242 370/329 |
| 2008/0075059 A1* | 3/2008 | Kermoal | H04B 17/382 370/343 |
| 2008/0130596 A1 | 6/2008 | Kalhan | |
| 2008/0130598 A1 | 6/2008 | Kalhan | |
| 2008/0132239 A1 | 6/2008 | Khetawat et al. | |
| 2008/0214197 A1* | 9/2008 | Englund | H04W 72/1278 455/450 |
| 2008/0268833 A1* | 10/2008 | Huang | H04B 7/024 455/425 |

(56) References Cited

U.S. PATENT DOCUMENTS

| | | |
|---|---|---|
| 2008/0311927 A1 | 12/2008 | Boman et al. |
| 2009/0088177 A1* | 4/2009 | Yang ............... H04W 16/14 455/452.2 |
| 2009/0098873 A1* | 4/2009 | Gogic ............. H04J 11/0069 455/436 |
| 2009/0129341 A1 | 5/2009 | Balasubramanian et al. |
| 2009/0156247 A1 | 6/2009 | Claussen et al. |
| 2009/0170542 A1* | 7/2009 | Chen ............... H04W 72/082 455/501 |
| 2009/0190633 A1* | 7/2009 | Smith ................ H04B 1/123 375/148 |
| 2009/0280819 A1* | 11/2009 | Brisebois ........ H04W 52/244 455/446 |
| 2009/0298420 A1 | 12/2009 | Haartsen et al. |
| 2009/0312028 A1* | 12/2009 | Burchfiel .......... H04B 7/0408 455/450 |
| 2010/0035615 A1* | 2/2010 | Kitazoe ............. H04W 48/02 455/436 |
| 2010/0087148 A1 | 4/2010 | Srinivasan et al. |
| 2010/0087149 A1 | 4/2010 | Srinivasan et al. |
| 2010/0087221 A1 | 4/2010 | Srinivasan et al. |
| 2010/0184437 A1* | 7/2010 | Dimou ............. H04W 92/20 455/436 |
| 2010/0201511 A1* | 8/2010 | Chabin ............... H04B 1/525 340/537.1 |
| 2010/0240314 A1 | 9/2010 | Chang et al. |
| 2010/0240362 A1* | 9/2010 | Karabinis ........ H04B 7/18513 455/427 |
| 2010/0298001 A1* | 11/2010 | Dimou ............... H04L 67/02 455/441 |
| 2011/0003608 A1* | 1/2011 | Forenza .............. H04B 7/01 455/501 |
| 2011/0009060 A1* | 1/2011 | Hsu .................. H04W 52/16 455/41.2 |
| 2011/0039589 A1* | 2/2011 | Skov ................ H04W 52/146 455/501 |
| 2011/0080825 A1* | 4/2011 | Dimou ............. H04J 11/0086 370/216 |
| 2011/0103347 A1* | 5/2011 | Dimou ........... H04W 36/0016 370/331 |
| 2011/0110349 A1* | 5/2011 | Grandhi ............. H04W 28/18 370/338 |
| 2011/0141895 A1* | 6/2011 | Zhang ................ H04L 12/66 370/235 |
| 2011/0143805 A1* | 6/2011 | Ramasamy ........ H04W 52/146 455/522 |
| 2011/0149168 A1* | 6/2011 | Frerking ............. H04H 20/06 348/723 |
| 2011/0164659 A1 | 7/2011 | Kawamura et al. |
| 2011/0176445 A1* | 7/2011 | Chen ................ H04L 5/0037 370/252 |
| 2011/0230200 A1* | 9/2011 | Dimou ............. H04W 28/00 455/452.2 |
| 2011/0237188 A1* | 9/2011 | Sen .................... H04B 15/00 455/41.2 |
| 2011/0237246 A1* | 9/2011 | Sen .................... H04W 72/082 455/426.1 |
| 2011/0275331 A1* | 11/2011 | Wang ................ H04W 52/146 455/73 |
| 2011/0280223 A1 | 11/2011 | Maeda et al. |
| 2011/0300805 A1* | 12/2011 | Gaikwad .......... H04W 52/244 455/63.1 |
| 2012/0051464 A1* | 3/2012 | Kamuf ............ H04L 25/03292 375/340 |
| 2012/0052891 A1* | 3/2012 | Irnich ............... H04W 52/243 455/501 |
| 2012/0071102 A1* | 3/2012 | Palomar ............. H04W 16/14 455/63.1 |
| 2012/0082043 A1* | 4/2012 | Hwang ................ H04L 5/001 370/252 |
| 2012/0088488 A1* | 4/2012 | Shi .................... H04W 24/10 455/418 |
| 2012/0120826 A1 | 5/2012 | Hao et al. |
| 2012/0135767 A1* | 5/2012 | Singh ................. H04W 16/14 455/509 |
| 2012/0202510 A1* | 8/2012 | Singh ................. H04W 4/20 455/452.1 |
| 2012/0202542 A1* | 8/2012 | Dimou ............... H04W 24/02 455/509 |
| 2012/0207040 A1* | 8/2012 | Comsa ............. H04W 72/1215 370/252 |
| 2012/0231833 A1* | 9/2012 | Kolding ............. H04W 52/243 455/522 |
| 2012/0257654 A1* | 10/2012 | Gilberton ......... H04W 72/1215 375/219 |
| 2012/0263047 A1* | 10/2012 | Love .................. H04W 72/00 370/252 |
| 2012/0269067 A1* | 10/2012 | Burchfiel .......... H04B 7/0408 370/236 |
| 2012/0282864 A1* | 11/2012 | Dimou ............... H04W 36/22 455/67.14 |
| 2012/0282942 A1* | 11/2012 | Uusitalo ............. H04W 16/14 455/452.2 |
| 2012/0327795 A1* | 12/2012 | Mallik ................ H04B 17/345 370/252 |
| 2013/0035041 A1* | 2/2013 | Sen .................... H04B 15/00 455/63.3 |
| 2013/0035047 A1* | 2/2013 | Chen .................. H04B 1/406 455/79 |
| 2013/0044621 A1* | 2/2013 | Jung ................. H04W 72/082 370/252 |
| 2013/0111235 A1 | 5/2013 | Yang et al. |
| 2014/0162674 A1* | 6/2014 | Yang .................... G06F 1/266 455/452.1 |

FOREIGN PATENT DOCUMENTS

| | | |
|---|---|---|
| CN | 101873686 A | 10/2010 |
| CN | 101895899 A | 11/2010 |
| CN | 102196542 A | 9/2011 |
| EP | 0 893 890 A2 | 1/1999 |
| WO | WO 2009/158546 A1 | 12/2009 |
| WO | WO 2010/090567 A1 | 8/2010 |

* cited by examiner

POWER CONTROL METHOD, APPARATUS AND SYSTEM

CROSS-REFERENCE TO RELATED APPLICATIONS

This application is a continuation of U.S. patent application Ser. No. 13/723,052, filed on Dec. 20, 2012, which is a continuation of International Application No. PCT/CN2012/073984, filed on Apr. 13, 2012. The International Application claims priority to Chinese Patent Application No. 201110142177.1, filed on May 27, 2011. The afore-mentioned patent applications are hereby incorporated by reference in their entireties.

TECHNICAL FIELD

The present invention relates to the field of mobile communications technologies, and in particular, to a power control method and apparatus.

BACKGROUND

With the development of mobile communications technologies, an existing 2nd generation (2nd Generation, 2G) communication network gradually evolves into a 3rd generation (3rd Generation, 3G) network and even to a 4G network. As the evolving process takes a long time, a situation where the 2G network, the 3G network and the 4G network coexist occurs.

In the prior art, to efficiently use spectrums of the 2G network, a 900 MHz spectrum of a global system for mobile communications (Global System for Mobile communications, GSM) network is reframed (Reframing) to be used in a universal mobile telecommunications system (Universal Mobile Telecommunications System, UMTS) network. To ensure normal running of the existing 2G network, the prior art proposes using a UMTS bandwidth lower than the standard spectrum bandwidth 5 MHz, for example, 4.2 MHz or 4.6 MHz, on the 900 MHz spectrum.

At present, in a situation where a low bandwidth is used, a protection bandwidth between frequencies of two different types of networks (for example, the GSM and the UMTS) is insufficient. In this case, signals of a first network (for example, the GSM) may cause high interference to a second network (for example, the UMTS).

SUMMARY

The present invention provides a power control method and apparatus, which can reduce interference of signals of a first network to a second network.

In one aspect, the present invention provides a power control method, where the method includes: when a service runs in a first-standard communication system, determining a transmit power P1 of a base station of the first-standard communication system; determining that the transmit power P1 is higher than or equal to a threshold value P2 of power interference of the first-standard communication system to a second-standard communication system; on an interfering frequency of the first-standard communication system, using a power lower than P1 to send data, where the interfering frequency is a frequency that causes interference to the second-standard communication system among hopping frequencies used by the service.

In another aspect, the present invention further provides a power control apparatus, where the apparatus includes: a first determination module, configured to, when a service runs in a first-standard communication system, determine a transmit power P1 of a base station of the first-standard communication system; a second determination module, configured to determine that the transmit power P1 is higher than or equal to a threshold value P2 of power interference of the first-standard communication system to a second-standard communication system; and a first sending module, configured to use, at an interfering frequency of the first-standard communication system, a power lower than P1 to send data, where the interfering frequency is a frequency that causes interference to the second-standard communication system among hopping frequencies used by the service.

According to the power control method, a signal transmit power of the interfering frequency of the first-standard communication system may be reduced when it is determined that the first-standard communication system will cause interference to the second-standard communication system, thereby reducing the interference of the first-standard communication system to the second-standard communication system.

BRIEF DESCRIPTION OF THE DRAWINGS

To describe technical solutions in the embodiments of the present invention or in the prior art more clearly, the accompanying drawings required in descriptions about the embodiments or the prior art are briefly described below. Apparently, the accompanying drawings described below illustrate only some embodiments of the present invention. Persons of ordinary skill in the art may obtain other accompanying drawings according to these accompanying drawings without creative efforts.

DETAILED DESCRIPTION

Figure 1:
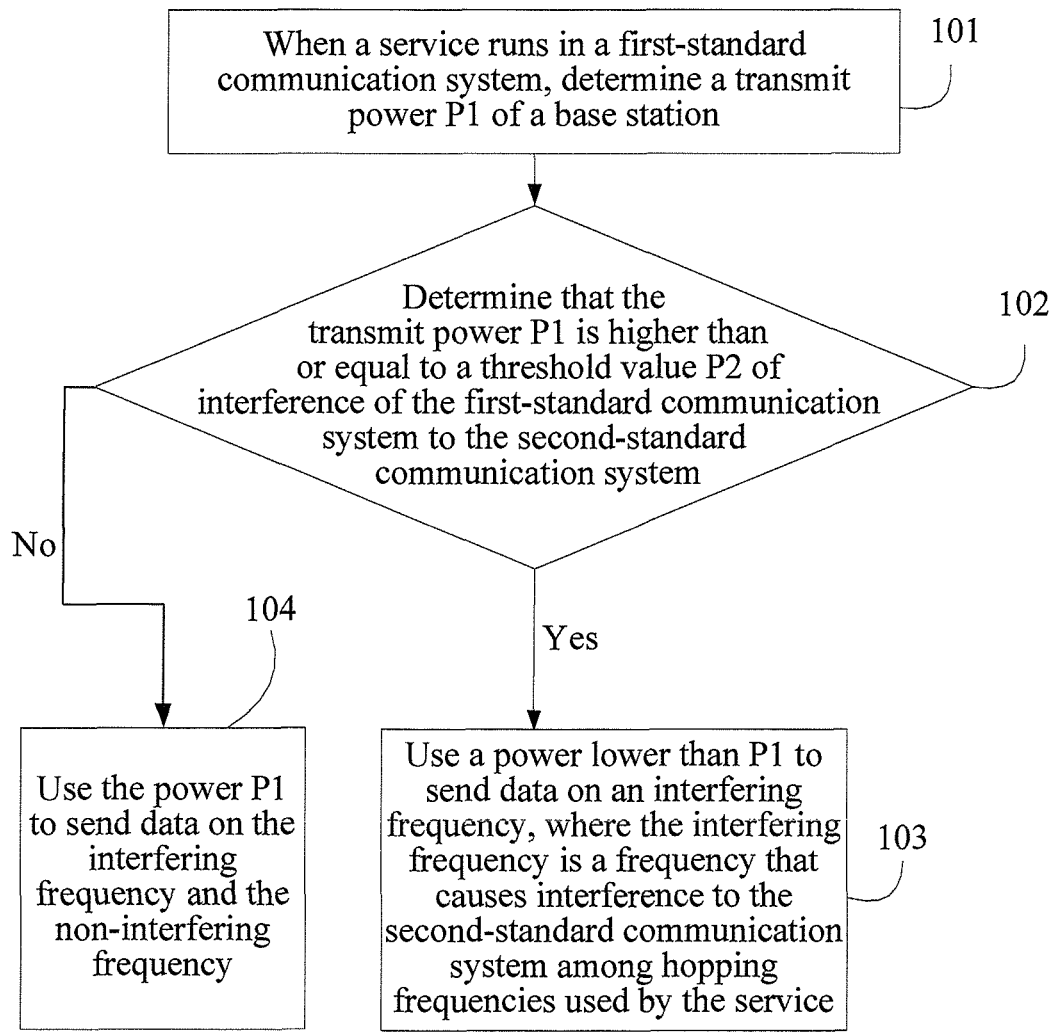
FIG. 1 is a flow chart of a power control method according to an embodiment of the present invention.

In the following description, details about a particular system structure, interface and technology are proposed for description rather than limitation, for ease of thorough understanding of the present invention. However, persons of ordinary skill in the art should know that the present invention may also be implemented in other embodiments without these details. In other situations, a well-known apparatus, circuit, and method are not described in detail to avoid obstruction of unnecessary details on the description about the present invention.

Technologies described in this specification may be applicable to various radio communication systems, for example, the existing 2G and 3G communication systems and a next-generation communication system, for example, a global system for mobile communications (GSM, Global System for Mobile communications), a code division multiple access (CDMA, Code Division Multiple Access) system, a time division multiple access (TDMA, Time Division Multiple Access) system, a wideband code division multiple access wireless (WCDMA, Wideband Code Division Multiple Access Wireless) system, a frequency division multiple addressing (FDMA, Frequency Division Multiple Addressing) system, an orthogonal frequency-division multiple access (OFDMA, Orthogonal Frequency-Division Multiple Access) system, a single-carrier FDMA (SC-FDMA) system, a general packet radio service (GPRS, General Packet Radio Service) system, a long term evolution (LTE, Long Term Evolution) system, and other communication systems of this type.

In this specification, various aspects are described with reference to a terminal and/or a base station and/or a base station controller.

The terminal may be a wireless terminal or a wired terminal. The wireless terminal may refer to an apparatus providing a user with voice and/or data connectivity, a handheld apparatus having a wireless connection function, or another processing apparatus connected to a wireless modem. The wireless terminal may communicate with one or multiple core networks through a radio access network (for example, RAN, Radio Access Network). The wireless terminal may be a mobile terminal, for example, a mobile phone (or referred to as a cellular phone), or a computer with a mobile terminal, for example, a portable, pocket, handheld, computer-build-in, or vehicle-mounted mobile apparatus, which exchanges voices and/or data with the radio access network, for example, a personal communication service (PCS, Personal Communication Service) phone, a cordless phone, a session initiation protocol (SIP) phone, a wireless local loop (WLL, Wireless Local Loop) station, a personal digital assistant (PDA, Personal Digital Assistant) apparatus. The wireless terminal may also be called a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The base station (for example, an access point) may refer to an apparatus that communicates with the wireless terminal through one or multiple sectors on an air interface in an access network. The base station may be configured to perform conversion between a received air frame and an IP packet, acting as a router between the wireless terminal and the rest part of the access network, where the rest part of the access network may include an Internet Protocol (IP) network. The base station may also coordinate attribute management on the air interface. For example, the base station may be a base transceiver station (BTS, Base Transceiver Station) in the GSM or CDMA, a NodeB (NodeB) in the WCDMA, or an evolved NodeB (eNB or e-NodeB, evolved Node B) in the LTE, which is not limited in the present invention.

The base station controller may be a base station controller (BSC, base station controller) in the GSM or CDMA, or a radio network controller (RNC, Radio Network Controller) in the WCDMA, which is not limited in the present invention.

In addition, the terms "system" and "network" in this specification are generally interchangeable. The wording "and/or" in this specification merely describes an association relationship between associated objects, indicating that three relationships may exist, for example, A and/or B may indicate three situations: only A exists, A and B exist at the same time, and only B exists. In addition, the character "/" in this specification generally indicates that two associated objects are in an "or" relationship.

When the GSM system and the UMTS system coexist, or the GSM system and the LTE (Long Term Evolution, long term evolution) system coexist, if a protection bandwidth between frequencies used by the coexisting systems is insufficient, interference between different communication systems may be caused. The embodiments of the present invention may be applicable to interference caused by coexisting of the GSM and UMTS systems or interference caused by coexisting of the GSM and LTE systems, or is applicable to interference caused between networks of the same standard. For ease of description, the specific embodiments of the present invention are described by using only the coexisting of the GSM and UMTS systems as an example. It should be understood that the present invention is not limited to communication systems of these two standards and may also involve communication systems of any other two standards; for example, this solution is also applicable to a situation where the GSM and LTE systems coexist.

The present invention provides a power control method, apparatus, and system. For better understanding of technical solutions of the present invention, the embodiments provided by the present invention are described in detail below with reference to the accompanying drawings.

Referring to FIG. 1, FIG. 1 is a flow chart of a power control method according to an embodiment of the present invention.

In this embodiment of the present invention, a first-standard communication system (a first network) coexists with a second-standard communication system (a second network), and a protection bandwidth between spectrum resources used by the first-standard communication system and the second-standard communication system is insufficient. The network standard of the first-standard communication system is different from that of the second-standard communication system, for example, the first-standard communication system is a GSM system and the second-standard communication system is a UMTS system, or the first-standard communication system is a GSM system and the second-standard communication system is an LTE system, which does not affect implementation of this embodiment. The power control method provided in this embodiment of the present invention includes the following steps.

101: When a service runs in the first-standard communication system, determine a transmit power P1 of a base station of the first-standard communication system.

When the service runs in the first-standard communication system, for example, when a user equipment (User Equipment, UE for short) initiates a service in the first-standard communication system, or when the service is handed over to the first-standard communication system, determine the transmit power P1 of the first-standard communication system regarding the service. For example, a power control apparatus performs, according to a measurement report that is reported by a terminal and in combination with a corresponding power control algorithm, a power control decision is made to determine the transmit power of the base station.

102: Determine that the transmit power P1 is higher than or equal to a threshold value P2 of interference of the first-standard communication system to the second-standard communication system.

A range of spectrums used by the first-standard communication system and the second-standard communication system may be preset by an operator. Therefore, a frequency that may cause interference may be determined according to the spectrum resources used by the two systems. In addition, the threshold value P2 of interference of the first-standard communication system to the second-standard communication system may be determined according to link performance.

Specifically, whether the transmit power P1 is higher than or equal to the threshold value P2 of interference of the first-standard communication system to the second-standard communication system may be judged first. When the judgment result is yes, it may be determined that the transmit power P1 is higher than or equal to the threshold value P2 of interference of the first-standard communication system to the second-standard communication system. Specifically, compare the transmit power P1 in 101 with the threshold value P2 of interference. The comparison between the two values may be performed according to the prior art. When it is determined that the transmit power P1 is higher than the threshold value P2 of interference of the first-standard communication system to the second-standard communication system, perform 103. When it is determined that the transmit power P1 is lower than the threshold value P2 of interference of the first-standard communication system to the second-standard communication system, perform 104.

103: At an interfering frequency, use a power lower than P1 to send data, where the interfering frequency is a frequency that causes interference to the second-standard communication system among hopping frequencies used by the service.

For example, when a service runs in the first-standard communication system, the first-standard communication system may assign hopping frequencies for the service to use. These hopping frequencies form a set of hopping frequencies of the service. In the set of these hopping frequencies, a frequency that causes interference to the second-standard communication system is an interfering frequency. For example, it may be set that, in the set of hopping frequencies used by the service, a frequency with a spacing to a center frequency of the second-standard communication system is smaller than a preset value is an interfering frequency, or it may be considered that, in the set of hopping frequencies, a frequency that occupies the same spectrum resources as the second-standard communication system is an interfering frequency. When it is determined that the transmit power P1 is higher than the threshold value P2 of interference of the first-standard communication system to the second-standard communication system, it may be considered that using the power P1 that is higher than P2 to send data on an interfering frequency may cause interference to the second-standard communication system. The first-standard communication system uses a power lower than the transmit power P1 to send data on these interfering frequencies, where the transmit power P1 is obtained according to the measurement report (that is, parameters reflecting a wireless environment) reported by the terminal and the power control algorithm for the service to use.

Optionally, reducing the transmit power of the interfering frequency may specifically be using the power of the threshold value P2 of interference to send data on the interfering frequency, or may be determining the transmit power of the interfering frequency according to a relationship between a performance loss caused by power reduction on the interfering frequency of the first-standard communication system and a performance gain of the second-standard communication system to achieve a balance between the performance loss of the first-standard communication system and the performance gain of the second-standard communication system, or may be determining the transmit power of the interfering frequency according to a power that can be compensated on a non-interfering frequency of the service to ensure performance of the service, or may be determining the transmit power of the interfering frequency from another standpoint, for example, ensuring QoS, which is not limited in this embodiment of the present invention.

104: Use the power P1 to send data on the interfering frequency and the non-interfering frequency.

When it is determined that the transmit power P1 is lower than the preset threshold value P2 of interference of the first-standard communication system to the second-standard communication system, the transmit power P1 of the interfering frequency does not reach the interference value and therefore does not cause interference to the second-standard communication system, or the interference caused to the second-standard communication system is within a preset allowable range, or can be ignored. In this situation, on a frequency assigned to the service, the transmit power P1 is used to send data, where the transmit power P1 is obtained according to the measurement report reported by the terminal and the power control algorithm for the service to use. That is, P1 is used as the power to send data on both the interfering frequency and the non-interfering frequency.

In the power control method provided in this embodiment of the present invention, when the transmit power P1 of the service of the first-standard communication system is higher than the threshold value P2 of interference, a power lower than P1 is used to send data at the interfering frequency. A signal transmit power of the interfering frequency of the first-standard communication system may be reduced when it is determined that the first-standard communication system will cause interference to the second-standard communication system, thereby reducing the interference of the first-standard communication system to the second-standard communication system.

Figure 2:
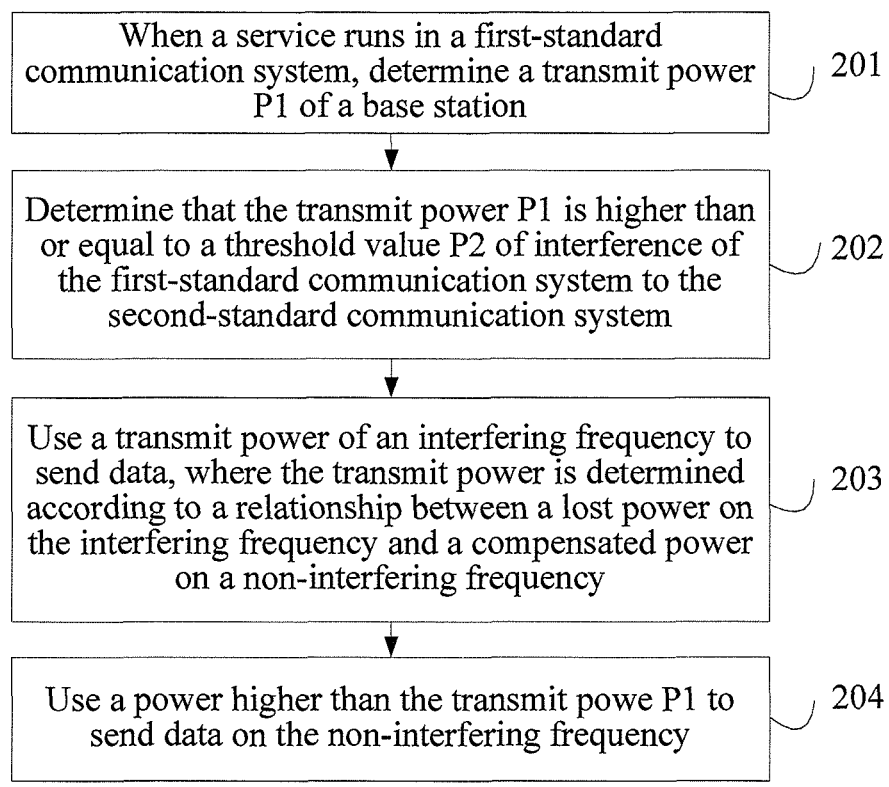
FIG. 2 is a flow chart of a power control method according to another embodiment of the present invention.

Referring to FIG. 2, FIG. 2 is a flow chart of a power control method according to another embodiment of the present invention.

In this embodiment of the present invention, the situation that a first-standard communication system is a GSM system and a second-standard communication system is a UMTS system is used as an example for detailed description.

201: When a service runs in the first-standard communication system, determine a transmit power P1 of a base station.

For the specific method, reference may be made to 101 in the preceding embodiment.

202: Determine that the transmit power P1 is higher than or equal to a threshold value P2 of interference of the first-standard communication system to the second-standard communication system.

It should be understood that when determining the threshold value of interference of the first-standard communication system to the second-standard communication system, the following factors may be considered: when the transmit power of the GSM system serving as the first-standard communication system is reduced to a certain value to reduce the interference to the UMTS system serving as the second-standard communication system, a performance gain of the UMTS system is maximized; and before the transmit power of the GSM system serving as the first-standard communication system is reduced to a certain value, the influence on the performance of the GSM system is not high, but after the transmit power of the GSM system is reduced to the value, if the transmit power of the GSM system continues to be reduced, the influence on the performance of the GSM system may significantly increases. When determining the threshold value P2 of interference, the two factors may be comprehensively considered to maximize the overall performance gain of the GSM system and the UMTS system.

203: Use a transmit power of an interfering frequency to send data, where the transmit power is determined according a relationship between a lost power on the interfering frequency and a compensated power on a non-interfering frequency.

For example, in a set of hopping frequencies that are assigned by the first-standard communication system to the service, hopping frequencies with a spacing to a center frequency of the second-standard communication system is smaller than W1 may be acquired, and these hopping frequencies with a spacing smaller than W1 are determined as interfering frequencies, where W1 is a quotient obtained by dividing a sum of a carrier frequency bandwidth of the first-standard communication system and that of the second-standard communication system by 2. That is, W1=(Carrier frequency bandwidth of the first-standard communication system+Carrier frequency bandwidth of the second-standard communication system)/2. A carrier frequency bandwidth of a network is related to the specific network standard, for example, if the first-standard communication system is a GSM network, the carrier frequency bandwidth is 200 KHz, and if the second-standard communication system is a UMTS network, the bandwidth is 5 MHz. It should be understood that a frequency band occupied by the second-standard communication system may be planned by an operator. Therefore, the center frequency may be known in advance.

On the determined interfering frequency, a transmit power adopted by the interfering frequency is determined according to the lost power on the interfering frequency and the compensated power on the non-interfering frequency. It should be understood that, according to provisions of a protocol, a system prescribes that each cell has a predetermined maximum transmit power, and when data is sent in the base station, the transmit power cannot exceeds the prescribed maximum transmit power. When the transmit power on the interfering frequency is reduced to reduce the interference to the second-standard communication system, the first-standard communication system may compensate the performance loss caused by the power reduction on the interfering frequency by using an interleaving gain and by increasing the power on the non-interfering frequency.

It should be understood that, when the transmit power on the interfering frequency is reduced, the transmit power on the non-interfering frequency needs to be increased to compensate the performance loss caused by the power reduction on the interfering frequency; as the maximum transmit power is limited, the transmit power on the non-interfering frequency may be increased to the maximum transmit power of a cell at most. That is, when the transmit power on the non-interfering frequency needs to be increased to compensate the loss, the maximum power that can be increased on each non-interfering frequency is a difference between the maximum transmit power of the cell and the determined transmit power P1. Therefore, when the number of interfering frequencies and the number of non-interfering frequencies are determined, the maximum lost power that can be compensated on the non-interfering frequency can be determined.

On the interfering frequency, the transmit power of the interfering frequency is generally reduced to the interference threshold at lowest (when the transmit power of the interfering frequency is reduced to the interference threshold, continuing to reduce the power does not bring a significant gain for the second-standard communication system but brings a huge loss to the first-standard communication system). That is, the maximum magnitude of transmit power reduction on the interfering frequency is generally a difference between the determined transmit power P1 and the threshold value P2 of interference. Therefore, when the number of interfering frequencies and the number of non-interfering frequencies are determined, the maximum transmit power that may be lost on the interfering frequency can be determined.

Further, the transmit power on the interfering frequency may be determined in the following manner: when the power on the interfering frequency is reduced to P2 and the power on the non-interfering frequency is increased to $P_{max}$, the transmit power of the interfering frequency is used to send data, where the transmit power is determined according to the relationship between the lost power on the interfering frequency and the compensated power on the non-interfering frequency, and $P_{max}$ is the maximum transmit power of a cell of the first-standard communication system where the service is located.

Specifically, the power that can be compensated on the non-interfering frequency is: (Maximum transmit power $P_{max}$ of the cell−Transmit power P1)×Number of non-interfering frequencies. The power that can be reduced on the interfering frequency is: (Transmit power P1−Threshold value P2 of interference)×Number of interfering frequencies. Comparing the power that can be compensated on the non-interfering frequency and the power that can be reduced on the interfering frequency, when the power that can be compensated on the non-interfering frequency is higher than the power that needs to be reduced on the interfering frequency, the power of the interfering frequency may be reduced to the interference threshold.

This is expressed by adopting a formula as follows: determine that $(P_{max}-P1) \times n1 > (P1-P2) \times n2 + P_{offset}$, offset where n1 is the number of non-interfering frequencies, n2 is the number of interfering frequencies, $P_{offset}$ is an offset of the compensated power, $P_{offset}$ is higher than or equal to o, $P_{max}$ is the maximum transmit power of the cell of the first-standard communication system where the service is located, P1 is the determined transmit power of the service, and P2 is the threshold value of interference of the first-standard communication system to the second-standard communication system.

Specifically, when it is determined that the power that can be compensated on the non-interfering frequency is higher than the power that needs to be reduce on the interfering frequency, on the interfering frequency, the power of the threshold value P2 of interference may be used to send data. On the non-interfering frequency, a power higher than the transmit power P1 is used to send data.

Further, this embodiment of the present invention may further include the following steps.

204: On the non-interfering frequency, use a power higher than the transmit power P1 to send data.

For example, the transmit power of the non-interfering frequency may be determined according to the transmit power on the interfering frequency for sending data.

The power lost on the interfering frequency is (Transmit power P1−Threshold value P2 of interference)×Number n2 of interfering frequencies, and the offset of the compensated power required on the non-interfering frequency is $P_{offset}$. Therefore, the power that needs to be increased on the non-interfering frequency is (Transmit power P1−Threshold value P2 of interference)×Number n2 of interfering frequencies+Offset $P_{offset}$ of the compensated power. In this case, on the non-interfering frequency, a transmit power P3 of the non-interfering frequency may be used to send data, where the transmit power P3 is determined according to the following formula: $P3=P1+[(P1-P2) \times n2+P_{offset}]/n1$, P3 is the determined transmit power of the non-interfering frequency, n1 is the number of non-interfering frequencies, n2 is the number of interfering frequencies, and $P_{offset}$ is the offset of the compensated power, $P_{offset}$ may be determined by link performance emulation or interleaving gain emulation.

Alternatively, a value of the power that needs to be increased on the non-interfering frequency and corresponds to a value of the power that is reduced on the interfering frequency may be obtained in advance on the basis that link performance can be compensated. That is, a corresponding relationship between the value of the power that is reduced on the interfering frequency and the value of the power that is increased on the non-interfering frequency is obtained. In a specific solution, when the specific power reduced on a certain interfering frequency is determined, the value of the power that needs to be compensated on the non-interfering frequency may be directly obtained according to the corresponding relationship. It should be understood that the relationship between the two values of power may be obtained in a manner in the prior art, for example, link performance emulation and statistics collection.

In this embodiment of the present invention, the power control apparatus of the first-standard communication system not only uses, on the interfering frequency, a power lower than the determined transmit power P1 to send data to the terminal, but also uses, on the non-interfering frequency, a power higher than the determined transmit power P1 to send data to the terminal. Therefore, the power loss brought to the terminal on the interfering frequency may be compensated, thereby ensuring normal communication of the terminal of the first network. When the value of the power that can be compensated on the non-interfering frequency exceeds the value of the power that can be reduced on the interfering frequency, the first-standard communication system determines the transmit power of the non-interfering frequency according to the lost power on the interfering frequency, or determines the transmit power of the non-interfering frequency according to the reduced power on the interfering frequency and the increased power on the non-interfering frequency, so as to achieve a balance between reducing the interference to the second-standard communication system and satisfying the link performance of the service of the first-standard communication system.

In still another embodiment of the present invention, a situation that a first-standard communication system is a GSM system and a second-standard communication system is a UMTS system is still used as an example for detailed description.

When a service runs in the first-standard communication system, a transmit power P1 of a base station is determined.

For the specific method, reference may be made to 101 in the embodiment corresponding to FIG. 1.

The transmit power P1 is higher than or equal to a threshold value P2 of interference of the first-standard communication system to the second-standard communication system is determined.

A transmit power of an interfering frequency is used to send data, where the transmit power is determined according a relationship between a lost power on the interfering frequency and a power that can be compensated on a non-interfering frequency.

When the power on the interfering frequency is reduced to P2 and the power on the non-interfering frequency is increased to $P_{max}$, the transmit power of the interfering frequency is used to send data, where the transmit power is determined according to the relationship between the lost power on the interfering frequency and the power that can be compensated on the non-interfering frequency, and $P_{max}$ is the maximum transmit power of a cell of the first-standard communication system where the service is located.

The power that can be compensated on the non-interfering frequency and the power that can be reduced on the interfering frequency may be determined in the manner in the preceding embodiment.

Specifically, when the power that can be compensated on the non-interfering frequency is lower than the power that can be reduced on the interfering frequency, as the power that can be compensated on the non-interfering frequency is lower than the lost power on the interfering frequency, when the power of the interfering frequency is reduced to the threshold value, performance of the service of the first-standard communication system cannot be ensured even when the power of the non-interfering frequency is increased to the maximum transmit power of the cell.

Therefore, when the power that can be compensated on the non-interfering frequency is lower than the power that can be reduced on the interfering frequency, it may be determined that the power of the non-interfering frequency is increased to the maximum transmit power of the cell, and a value of the power that can be reduced on the interfering frequency is determined according to a value of the maximum power that can be compensated on the non-interfering frequency.

For example, this may be expressed by adopting a formula as follows: determine that $(P_{max}-P1) \times n1 < (P1-P2) \times n2 + P_{offset}$, where n1 is the number of non-interfering frequencies, n2 is the number of interfering frequencies, $P_{offset}$ is an offset of the compensated power, P1 is the determined transmit power of the service, and P2 is the threshold value of interference of the first-standard communication system to the second-standard communication system. In this situation, on the non-interfering frequency, the power $P_{max}$ is used to send data. A transmit power P4 of the interfering frequency may be determined according the following formula for sending data: $P4=P1-(P_{max}-P1) \times n1/n2$, where P4 is the determined transmit power of the interfering frequency, n1 is the number of non-interfering frequencies, and n2 is the number of interfering frequencies. Definitely, when determining the power that can be reduced on the interfering frequency according to the increased power on the non-interfering frequency, the value of the power that is reduced on the interfering frequency may be directly determined according a corresponding relationship between the value of the compensated power on the non-interfering frequency and the value of the lost power on the interfering frequency and the link performance. On the interfering frequency, the power on the interfering frequency is reduced based on the determined transmit power P1 of the service.

In this embodiment of the present invention, a power control apparatus of the first-standard communication system not only uses, on the interfering frequency, a power lower than the determined transmit power P1 to send data to a terminal, but also uses, on the non-interfering frequency, a power higher than the determined transmit power P1 to send data to the terminal. Therefore, the power loss brought to the terminal on the interfering frequency may be compensated, thereby ensuring normal communication of the terminal of the first network. When the value of the power that can be compensated on the non-interfering frequency is lower than the value of the power that can be reduced on the interfering frequency, the first-standard communication system determines the power that can be lost on the interfering frequency according to the power that can be compensated on the non-interfering frequency and further determines the transmit power of the interfering frequency, or determines the transmit power of the non-interfering frequency according to the reduced power on the interfering frequency and the increased power on the non-interfering frequency, so as to achieve a balance between reducing the interference to the second-standard communication system and satisfying the link performance of the service of the first-standard communication system.

Figure 3:
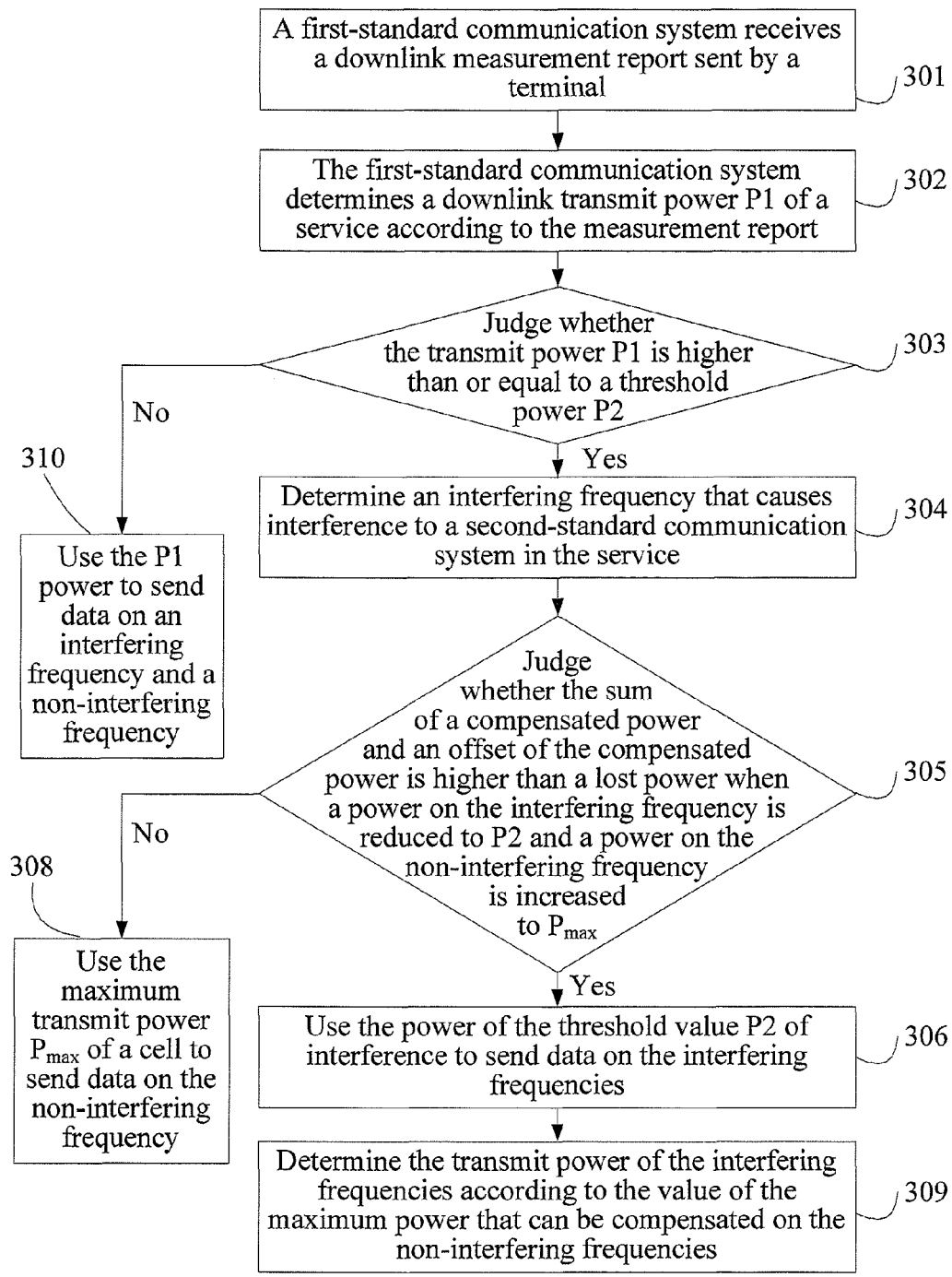
FIG. 3 is a flow chart of a power control method according to still another embodiment of the present invention.

For further detailed description of this embodiment of the present invention, refer to FIG. 3. FIG. 3 is a flow chart of a power control method according to still another embodiment of the present invention.

In an application scenario of this method embodiment, a first-standard communication system is a GSM network with a carrier frequency bandwidth of 200 kHz and a second-standard communication system is a UMTS network or a long term evolution (Long Term Evolution, LTE) system, for example, a carrier frequency bandwidth of the LTE system may be 3 MHz, 5 MHz, or 10 MHz, and a carrier frequency bandwidth of UMTS system is 5 MHz. In this embodiment of the present invention, a situation that the second-standard communication system is the UMTS system is taken as an example for description. A service is initiated in the GSM system, or is handed over to the GSM system, and the GSM system assigns corresponding hopping frequencies for the service. In this embodiment of the present invention, it is assumed that the hooping frequencies assigned to the service are {1, 3, 5, 7, 9, 10}, corresponding frequencies are {935.2, 935.6, 936, 936.4, 936.8, 937}, the unit is MHz, and a center frequency of the UMTS network is 939.3 MHz.

301: The first-standard communication system receives a downlink measurement report sent by a terminal.

When a service runs in the first-standard communication system (for example, a service is initiated or handed over), a power control apparatus of the first-standard communication system receives a measurement report sent by the terminal where the service runs, where the downlink measurement report carries the strength and quality of an uplink signal received by the terminal to embody a wireless environment where the service is located.

302: The first-standard communication system determines a downlink transmit power P1 of the service according to the measurement report.

Specifically, the power control apparatus of the first-standard communication system determines, according to the measurement report, the transmit power P1 of a (cell) base station during service running. The specific calculation method may adopt the prior art. For example, in this embodiment of the present invention, it is determined that the downlink transmit power P1 of the service is 14 W, and the maximum transmit power $P_{max}$ of a cell configured in the GSM network is 20 W.

303: Judge whether the transmit power P1 is higher than or equal to a threshold power P2 of interference of the first-standard communication system to the second-standard communication system.

It should be understood that the threshold power P2 of interference of the first-standard communication system to the second-standard communication system may be determined according to the prior art, for example, emulation. The transmit power P1 and the threshold power P2 of interference are compared. The specific comparison may be performed in a manner in the prior art. When the transmit power P1 exceeds the threshold power P2 of interference, it is determined that the transmit power P1 exceeds the threshold power P2 of interference of the first-standard communication system to the second-standard communication system, and perform 304; when the transmit power P1 is lower than the threshold power P2 of interference, it is determined that the transmit power P1 is lower than the threshold power P2 of interference of the first-standard communication system to the second-standard communication system, and perform 310. It should be realized that this step may also be judging whether the transmit power P1 exceeds the threshold power P2 of interference of the first-standard communication system to the second-standard communication system, which does not influence implementation of this embodiment of the present invention.

For example, the UMTS system determines, according to parameters such as link performance and acceptable throughput, that the downlink threshold power P2 of interference of the second-standard communication system is 10 W.

304: Determine an interfering frequency that causes interference to the second-standard communication system in the service.

For example, the power control apparatus of the GSM system acquires an interfering frequency of the service. It can be known that the center frequency of the UMTS system is 939.3 MHz, and spacing from the frequencies 9 and 10 in the set of the hopping frequencies of the service to the center frequency of the UMTS system is 2.5 and 2.3 respectively, which is smaller than W3, where W3=(0.2+5)/2=2.6. Therefore, it is determined that, in the hopping frequencies of the service, the frequencies 9 and 10 are interfering frequencies, and the frequencies 1, 3, 5, and 7 are non-interfering frequencies. It can be seen that, in the scenario of this embodiment, the number of frequencies of the specific service that cause interference to the second-standard communication system is n2=2, and the number of non-interfering frequencies is n1=4.

305: Judge whether the power compensated on the non-interfering frequencies is higher than the sum of an offset of the compensated power and the power lost on the interfering frequencies when the power on the interfering frequencies is reduced to P2 and the power on the non-interfering frequencies is increased to $P_{max}$.

It can be known from the preceding embodiment that when the power on the interfering frequencies is reduced to P2, the power that can be reduced on the interfering frequencies is: (Transmit power P1−Threshold value P2 of interference)× Number n2 of interfering frequencies. The power that can be compensated on the non-interfering frequencies is: (Maximum transmit power $P_{max}$ of a cell−Transmit power P1)× Number n1 of non-interfering frequencies. The offset of the compensated power is $P_{offset}$.

This is expressed by adopting a formula as follows: judge whether the formula $(P_{max}-P1) \times n1 > (P1-P2) \times n2 + P_{offset}$ is correct, where n1 is the number of non-interfering frequencies, n2 is the number of interfering frequencies, $P_{offset}$ is the offset of the compensated power, $P_{max}$ is the maximum transmit power of the cell of the first-standard communication system where the service is located, P1 is the determined transmit power of the service, and P2 is the threshold value of interference of the first-standard communication system to the second-standard communication system.

It can be understood that this step may also be judging whether the sum of the power compensated on the non-interfering frequencies and the offset of the compensated power is higher than or equal to the power lost on the interfering frequencies when the power on the interfering frequencies is reduced to P2 and the power on the non-interfering frequencies is increased to $P_{max}$, which is not limited in the present invention.

Specifically, in the scenario of this embodiment, the power that can be compensated on the non-interfering frequencies is: $(P_{max}-P1) \times n1=(20-14) \times 4=24$ W, and the power that can be reduced on the interfering frequencies is: $(P1-P2) \times n2= (14-10) \times 2=8$. It is assumed that the offset of the compensated power is $P_{offset}=3$, $(P1-P2)\times n2+P_{offset}=8+3=11$. In this situation, as it is judged that the formula $(P_{max}-P1)\times n1>(P1-P2)\times n2+P_{offset}$ is correct, perform 306. If it is judged that the preceding formula is incorrect according to the number of interfering frequencies, the number of non-interfering frequencies and other parameters, perform 308.

306: On the interfering frequencies, use the power of the threshold value P2 of interference to send data.

Specifically, the power control apparatus of the GSM system controls the base station to use the power P2 to send downlink data of the service.

307: On the non-interfering frequency, use a power higher than the transmit power P1 to send data.

As the transmit power is reduced on the interfering frequencies, the transmit power on the non-interfering frequencies is increased.

Further, the transmit power of the non-interfering frequency may be determined according to the transmit power on the interfering frequencies for sending data.

For example, the power lost on the interfering frequencies is (Transmit power P1−Threshold value P2 of interference)×Number n2 of interfering frequencies, and the offset of the compensated power required on the non-interfering frequencies is $P_{offset}$. Therefore, the power that needs to be increased on the non-interfering frequencies is (Transmit power P1−Threshold value P2 of interference)×Number n2 of interfering frequencies+Offset $P_{offset}$ of the compensated power. In this case, a transmit power P3 of the non-interfering frequencies may be used to send data, where the transmit power P3 is determined according to the following formula: $P3=P1+[(P1-P2)\times n2+P_{offset}]/n1$, P3 is the determined transmit power of the non-interfering frequency, n1 is the number of non-interfering frequencies, n2 is the number of interfering frequencies, and $P_{offset}$ is the offset of the compensated power.

Specifically, in the scenario of this embodiment, it may be determined that the transmit power of the non-interfering frequency=$14+[(14-10)\times 2+3]/4=16.75$. In this embodiment of the present invention, a result obtained through the calculation may be rounded up, for example, 16.75 W is rounded up to 17 W. Definitely, the result may also be rounded down to 16.

308: If it is determined that the formula $(P_{max}-P1)\times n1>(P1-P2)\times n2+P_{offset}$ is incorrect, on the non-interfering frequencies, use the maximum transmit power $P_{max}$ of the cell to send data.

For example, the power control apparatus of the GSM system controls the base station to use the power $P_{max}$ to send downlink data of the service.

309: Determine the transmit power of the interfering frequency according to the value of the maximum power that can be compensated on the non-interfering frequencies.

Further, a transmit power P4 of the interfering frequency may be determined according to the following formula for sending data: $P4=P1-[(P_{max}-P1)\times n1+P_{offset}]/n2$, where P4 is the determined transmit power of the interfering frequency, n1 is the number of non-interfering frequencies, and n2 is the number of interfering frequencies. Definitely, when determining the power that can be reduced on the interfering frequencies according to the increased power on the non-interfering frequencies, the value of the power that is reduced on the interfering frequencies may be directly determined according a corresponding relationship between the value of the compensated power on the non-interfering frequencies and the value of the lost power on the interfering frequencies and the link performance. On the interfering frequencies, the power on the interfering frequencies is reduced based on the determined transmit power P1 of the service.

310: Use the power P1 to send data on both the interfering frequencies and the non-interfering frequencies.

When the judgment result of 303 is that the transmit power P1 does not exceed the threshold power P2 of interference of the first-standard communication system to the second-standard communication system, as no interference may be caused to the second-standard communication system, or caused interference is within a controllable range, the power P1 is used to send data on the interfering frequencies and the non-interfering frequencies of the service.

In this embodiment of the present invention, the power control apparatus of the first-standard communication system determines the transmit powers of the service on the interfering frequencies and non-interfering frequencies by judging whether the sum of the power that can be compensated on the non-interfering frequencies and the offset of the compensated power can compensate the power lost on the interfering frequencies. In this way, service performance of the first-standard communication system is ensured while the interference to the second-standard communication system is reduced.

Figure 4:
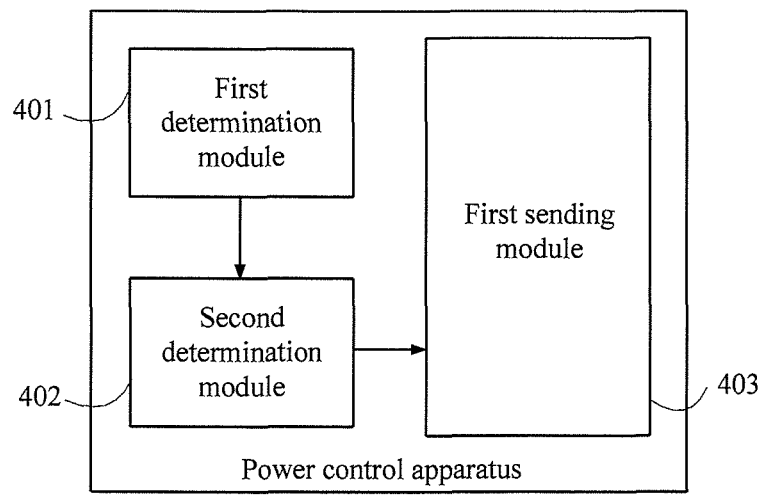
FIG. 4 is a schematic structural diagram of a power control apparatus according to an embodiment of the present invention.

Referring to FIG. 4, FIG. 4 is a schematic structural diagram of a power control apparatus according to an embodiment of the present invention. As shown in FIG. 4, the power control apparatus in this embodiment of the present invention includes:

A first determination module 401 is configured to, when a service runs in a first-standard communication system, determine a transmit power P1 of a base station.

When the service runs in the first-standard communication system, for example, when a user equipment (User Equipment, UE for short) initiates a service in the first-standard communication system, or when the service is handed over to the first-standard communication system, the first determination module determines the transmit power P1 of the base station regarding the service.

A second determination module 402 is configured to determine that the transmit power P1 is higher than or equal to a threshold value P2 of interference of the first-standard communication system to a second-standard communication system.

The second determination module may determine that the transmit power P1 is higher than the threshold value P2 of interference of the first-standard communication system to the second-standard communication system by comparing the transmit power P1 with the threshold value P2 of interference, and when it is determined that the transmit power P1 is higher than the threshold value P2 of interference of the first-standard communication system to the second-standard communication system, triggers a first determination module to perform operation.

The first sending module 403 is configured to use a power lower than P1 to send data on an interfering frequency, where the interfering frequency is a frequency that causes interference to the second-standard communication system among hopping frequencies used by the service.

When the second determination module determines that the transmit power P1 is higher than the threshold value P2 of interference of the first-standard communication system to the second-standard communication system, it may be considered that using the power P1 that is higher than P2 to send data on an interfering frequency may cause interference to the second-standard communication system. The first-standard communication system uses a power lower than the transmit power P1 to send data on these interfering frequencies, where the transmit power P1 is obtained according to a measurement report (that is, parameters reflecting a wireless environment) reported by a terminal and a power control algorithm for the service to use.

As an optional solution, reducing, by the first sending module, the transmit power on the interfering frequency may specifically be using the power of the threshold value P2 of interference to send data on the interfering frequency, or may be determining the transmit power of the interfering frequency according to a relationship between a performance loss caused by power reduction on the interfering frequency of the first-standard communication system and a performance gain of the second-standard communication system to achieve a balance between the performance loss of the first-standard communication system and the performance gain of the second-standard communication system, or may be determining the transmit power of the interfering frequency according to a power that can be compensated on a non-interfering frequency of the service to ensure performance of the service, or may be determining the transmit power of the interfering frequency from another standpoint, for example, ensuring QoS, which is not limited in this embodiment of the present invention.

Further, this embodiment of the present invention may further include:

a third determination module, configured to determine that the transmit power P1 is lower than the threshold value P2 of interference of the first-standard communication system to the second-standard communication system; and a third sending module, configured to use the power P1 to send data on the interfering frequency and the non-interfering frequency.

According to the power control apparatus provided in this embodiment of the present invention, when the second determination module determines that the transmit power P1 of the service of the first-standard communication system is higher than the threshold value P2 of interference, the first sending module uses a power lower than P1 to send data on the interfering frequency. In this way, the interference of the first-standard communication system to the second-standard communication system is reduced.

Figure 5:
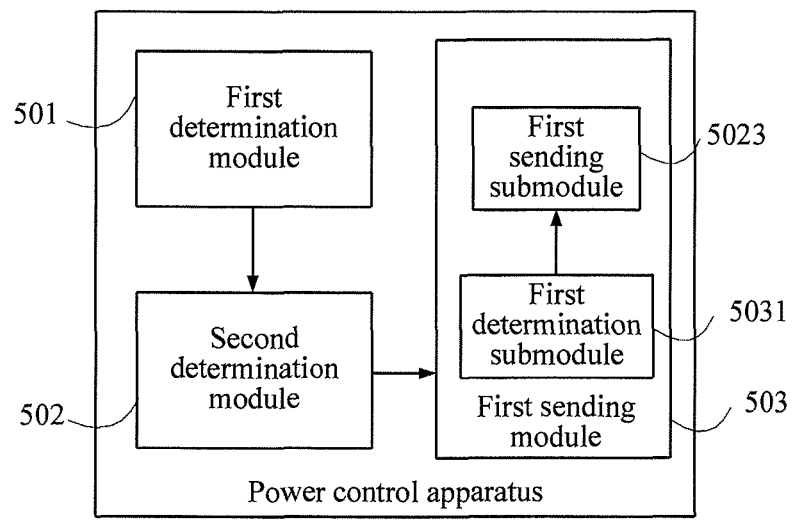
FIG. 5 is a schematic structural diagram of a power control apparatus according to another embodiment of the present invention.

Referring to FIG. 5, FIG. 5 is a schematic structural diagram of a power control apparatus according to another embodiment of the present invention. As shown in FIG. 5, the power control apparatus in this embodiment of the present invention includes: a first determination module 501, a second determination module 502, and a first sending module 503. For the specific implementation method, reference may be made to the preceding embodiment.

In this embodiment, specifically, the first sending module may be configured to use a power of a threshold value P2 of interference to send data on an interfering frequency.

Alternatively, the first sending module may also be configured to, when a power on the interfering frequency is reduced to P2 and a power on a non-interfering frequency is increased to $P_{max}$, use a transmit power of the interfering frequency to send data, where the transmit power is determined according to a relationship between a lost power on the interfering frequency and a compensated power on the non-interfering frequency, and $P_{max}$ is the maximum transmit power of a cell of a first-standard communication system where a service is located.

Further, the first sending module may include:

a first determination submodule 5031, configured to determine that $(P_{max}-P1) \times n1 > (P1-P2) \times n2 + P_{offset}$, where n1 is the number of non-interfering frequencies, n2 is the number of interfering frequencies, $P_{offset}$ is an offset of the compensated power, $P_{max}$ is the maximum transmit power of the cell of the first-standard communication system where the service is located, P1 is the determined transmit power of the service, and P2 is a threshold value of interference of the first-standard communication system to a second-standard communication system; and a first sending submodule 5023, configured to use the power of the threshold value P2 of interference to send data on the interfering frequency.

Further, the apparatus in this embodiment may further include:

a second sending module, configured to use a transmit power of the non-interfering frequency to send data, where the transmit power is determined according to the transmit power on the interfering frequency.

The power lost on the interfering frequency is (Transmit power P1−Threshold value P2 of interference)×Number n2 of interfering frequencies, and an offset of the compensated power required on the non-interfering frequency is $P_{offset}$. Therefore, the power that needs to be increased on the non-interfering frequency is (Transmit power P1−Threshold value P2 of interference)×Number n2 of interfering frequencies+Offset $P_{offset}$ of the compensated power. In this case, optionally, the second sending module may be configured to use a transmit power P3 of the non-interfering frequency to send data, where the transmit power P3 is determined according to the following formula: $P3=P1+[(P1-P2) \times n2+P_{offset}]/n1$, P3 is the determined transmit power of the non-interfering frequency, n1 is the number of non-interfering frequencies, n2 is the number of interfering frequencies, and $P_{offset}$ is the offset of the compensated power.

Figure 6:
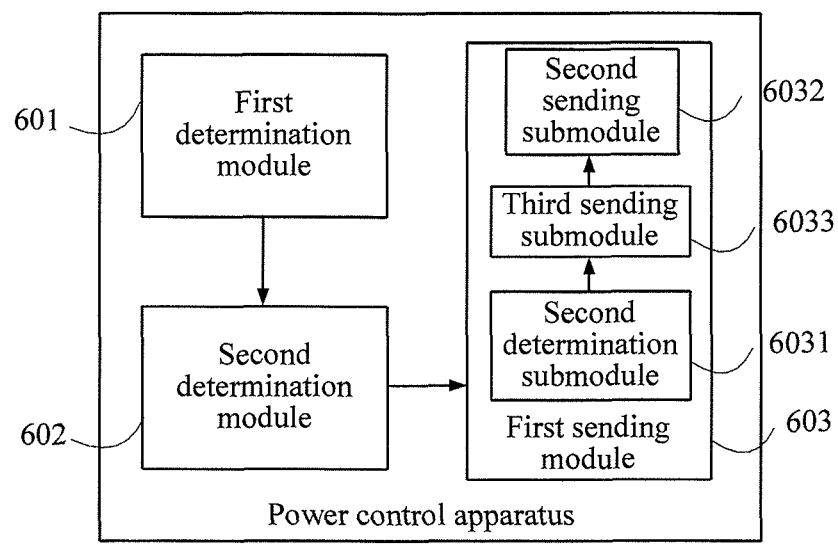
FIG. 6 is a schematic structural diagram of a power control apparatus according to still another embodiment of the present invention.

Referring to FIG. 6, FIG. 6 is a schematic structural diagram of a power control apparatus according to still another embodiment of the present invention. As shown in FIG. 6, the power control apparatus in this embodiment of the present invention includes: a first determination module 601, a second determination module 602, and a first sending module 603. For the specific implementation method, reference may be made to the preceding embodiment.

In this embodiment, specifically, the first sending module may include:

a second determination submodule 6031, configured to determine that $(P_{max}-P1) \times n1 < (P1-P2) \times n2 + P_{offset}$, where n1 is the number of non-interfering frequencies, n2 is the number of interfering frequencies, $P_{offset}$ is an offset of a compensated power, P1 is the determined transmit power of a service, and P2 is a threshold value of interference of the first-standard communication system to the second-standard communication system;

a second sending submodule 6032, configured to use the power $P_{max}$ to send data on a non-interfering frequency; and a third sending submodule 6033, configured to use a transmit power P4 of an interfering frequency to send data, where the transmit power P4 is determined according to the following formula: $P4=P1-(P_{max}-P1) \times n1/n2$, where P4 is the determined transmit power of the interfering frequency, n1 is the number of non-interfering frequencies, and n2 is the number of interfering frequencies.

Persons of ordinary skill in the art are able to clearly understand that, for ease and concise of description, for the specific working processes of the system, apparatus and unit described previously, reference may be made to the corresponding processes in the foregoing method embodiments, and details are not described herein.

In the embodiments provided in the present application, it should be understood that the disclosed system, apparatus and method may be implemented in other manners. For example, the apparatus embodiment described above is merely exemplary. For example, the division of units is merely a division of logical functions and another division mode may be used in actual implementation. For example, multiple units or components may be combined or integrated into another system or some features may be ignored or not executed. Further, the illustrated or described coupling, direct coupling, or communicative connections may be accomplished through some interfaces, and indirect coupling or communicative connections between apparatuses or units may be in electrical or mechanical form, or another form.

Units described as separate components may be or may not be physically separate, and parts displayed as units may be or may not be physical units, that is, the parts may be located at a position or distributed on multiple network units. A part of or all of the units may be selected as required to achieve the objectives of the solutions of the embodiments.

In addition, all function units in embodiments of the present invention may be integrated in a processing unit, or each unit may independently and physically exists, or two or more than two function units may be integrated into a unit. The integrated unit may be not only implemented by adopting the form of hardware, but also implemented by adopting the form of a software functional unit.

When being implemented in the form of a software functional unit and being sold or used as an independent product, the integrated unit may be stored in a computer readable storage medium. Based on such understanding, the technical solutions of the present invention may be essentially or the part contributing to the prior art or all or a part of the technical solutions may be embodied in the form of a software product. The computer software product may be stored in a storage medium, including several instructions used to enable a computer device (for example, a personal computer, a server, or a network device) to implement all or a part of steps of a method in each embodiment of the present invention. The storage medium includes any medium that is capable of storing program codes, for example, a U disk, a portable hard disk, a read-only memory (ROM, Read-Only Memory), a random access memory (RAM, Random Access Memory), a magnetic disk, or a CD-ROM.

It should be noted that the foregoing embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not cause the essence of corresponding technical solutions to depart from the spirit and scope of the present invention.

What is claimed is:

1. A power control method, comprising:
    determining a transmit power P1 of a base station of a first-standard communication system when a service runs in the first-standard communication system;
    determining that the transmit power P1 is higher than or equal to a threshold value P2 of a power interference of the first-standard communication system to a second-standard communication system, wherein the first-standard communication system is different from the second-standard communication system;
    sending data on an interfering frequency of the first-standard communication system by using a power lower than transmit power P1, wherein the interfering frequency is a frequency that causes an interference to the second-standard communication system among hopping frequencies used by the service; and
    sending data on a non-interfering frequency of the first-standard communication system by using a power higher than the transmit power P1.

2. The method according claim 1, wherein sending data on the interfering frequency of the first-standard communication system by using the power lower than transmit power P1 comprises:
    sending the data on the interfering frequency by using a power of the threshold value P2 of the interference.

3. The method according claim 1, wherein the power for sending data on the interfering frequency is determined according to a relationship between a lost power on the interfering frequency when the power for sending data on the interfering frequency is reduced to the P2 and a compensated power on the non-interfering frequency when the power for sending data on the non-interfering frequency is increased to $P_{max}$, the $P_{max}$ is a maximum transmit power of a cell of the first-standard communication system where the service is ran.

4. The method according to claim 1, wherein sending data on the non-interfering frequency of the first-standard communication by using the power higher than the transmit power P1 comprises:
    sending the data on the non-interfering frequency by using a transmit power of $P_{max}$.

5. The method according to claim 1, further comprising:
    determining that $(P_{max}-P1) \times n1 < (P1-P2) \times n2 + P_{offset}$, wherein the n1 is a number of non-interfering frequencies, the n2 is a number of interfering frequencies, and the $P_{offset}$ is an offset of the compensated power; and
    wherein sending data on the interfering frequency of the first-standard communication system by using the power lower than transmit power P1 comprises:
        sending the data on the interfering frequency by using a transmit power P4, wherein the transmit power P4 is determined according to a following formula: $P4=P1-[(P_{max}-P1) \times n1+P_{offset}]/n2$, the n1 is the number of non-interfering frequencies, and the n2 is the number of interfering frequencies.

6. The method according to claim 1, further comprising:
    determining that the transmit power P1 is lower than the threshold value P2 of the power interference of the first-standard communication system to the second-standard communication system; and
    sending the data on the interfering frequency and sending the data on the non-interfering frequency by using the transmit power P1.

7. The method according to claim 1, wherein the power for sending data on the interfering frequency of the first-standard communication system is determined according a relationship between a lost power on the interfering frequency and a compensated power on the non-interfering frequency.

8. A power control apparatus, comprising:
    a processor, configured to determine a transmit power P1 of a base station of a first-standard communication system when a service runs in the first-standard communication system, and determine whether the transmit power P1 is higher than or equal to a threshold value P2 of a power interference of the first-standard communication system to a second-standard communication system;
    a transmitter, configured to send data on an interfering frequency of the first-standard communication system by using a power lower than P1 when the transmit power P1 is higher than or equal to a threshold value P2 of a power interference of the first-standard communication system to a second-standard communication system, wherein the interfering frequency is a frequency that causes an interference to the second-standard communication system among frequencies used by the service; and send data on a non-interfering frequency by using a power higher than the transmit power P1.

9. The apparatus according to claim 8, wherein the transmitter is configured to use the power of the interference value P2 of interference to send the data on the interfering frequency.

10. The apparatus according to claim 8, wherein the transmitter is configured to use a transmit power of $P_{max}$ to send the data on the non-interfering frequency.

11. The apparatus according to claim 8, wherein the transmitter is further configured to determine the power for sending data on the interfering frequency according to a relationship between a lost power on the interfering frequency when the power for sending data on the interfering frequency is reduced to the P2 and a compensated power on the non-interfering frequency when the power for sending data on the non-interfering frequency is increased to $P_{max}$, the $P_{max}$ is a maximum transmit power of a cell of the first-standard communication system where the service is ran.

12. The apparatus according to claim 8, wherein:
the processor is configured to determine that $(P_{max}-P1) \times n1 < (P1-P2) \times n2 + P_{offset}$, wherein the n1 is a number of non-interfering frequencies, the n2 is a number of interfering frequencies, and the $P_{offset}$ is an offset of the compensated power;

the transmitter is configured to use the power $P_{max}$ to send the second data on the non-interfering frequency; and
the transmitter is configured to use a transmit power P4 of the interfering frequency to send the first data, wherein the transmit power P4 is determined by the processor according to the following formula: $P4=P1-[(P_{max}-P1) \times n1+P_{offset}]/n2$, P4 is the determined transmit power of the interfering frequency, the n1 is a number of non-interfering frequencies, and the n2 is a number of interfering frequencies.

13. The apparatus according to claim 8, wherein:
the processor is further configured to determine whether the transmit power P1 is lower than the threshold value P2 of interference of the first-standard communication system to the second-standard communication system; and
the transmitter is further configured to use the power P1 to send data on the interfering frequency and the non-interfering frequency when the third determination module determines that the transmit power P1 is lower than the threshold value P2 of interference of the first-standard communication system to the second-standard communication system.

14. The apparatus according to claim 8, wherein the processor is configured to determine the power for sending data on the interfering frequency of the first-standard communication system according a relationship between a lost power on the interfering frequency and a compensated power on the non-interfering frequency.

* * * * *